(12) United States Patent
Karve

(10) Patent No.: US 11,598,441 B2
(45) Date of Patent: Mar. 7, 2023

(54) COOLANT CONTROL VALVE WITH NON-COAXIAL ROTARY VALVE BODIES

(71) Applicant: Schaeffler Technologies AG & Co. KG, Herzogenaurach (DE)

(72) Inventor: Ashish Karve, Troy, MI (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 467 days.

(21) Appl. No.: 16/702,027

(22) Filed: Dec. 3, 2019

(65) Prior Publication Data

US 2021/0164579 A1 Jun. 3, 2021

(51) Int. Cl.
| | | |
|---|---|---|
| F16K 31/04 | (2006.01) | |
| F16K 27/00 | (2006.01) | |
| F01P 7/14 | (2006.01) | |
| F16K 11/22 | (2006.01) | |
| F16K 11/16 | (2006.01) | |
| F16K 31/53 | (2006.01) | |
| F01P 7/16 | (2006.01) | |

(52) U.S. Cl.
CPC .............. *F16K 31/041* (2013.01); *F01P 7/14* (2013.01); *F16K 11/165* (2013.01); *F16K 11/22* (2013.01); *F16K 27/003* (2013.01); *F16K 31/043* (2013.01); *F16K 31/535* (2013.01); *F01P 7/16* (2013.01); *F01P 2007/146* (2013.01)

(58) Field of Classification Search
CPC ...... F16K 31/041; F16K 11/165; F16K 11/22; F16K 27/003; F16K 31/043; F16K 31/535; F16K 11/0873; F01P 7/14; F01P 7/16; F01P 2007/146
See application file for complete search history.

(56) References Cited

U.S. PATENT DOCUMENTS

| | | | | |
|---|---|---|---|---|
| 4,749,004 A | * | 6/1988 | Peash | F16K 11/22 137/865 |
| 4,890,648 A | * | 1/1990 | Giordano | F16K 11/0876 137/594 |
| 6,197,195 B1 | * | 3/2001 | Booth | B01D 29/96 137/630.17 |
| 6,308,739 B1 | * | 10/2001 | Barbuto | F16K 5/0478 137/625.11 |
| 6,886,508 B1 | * | 5/2005 | Luffy | F01M 3/00 123/73 AD |
| 6,976,505 B2 | | 12/2005 | McLane et al. | |
| 8,267,119 B2 | | 9/2012 | Moench et al. | |
| 9,404,594 B2 | | 8/2016 | Morein | |
| 9,500,299 B2 | | 11/2016 | Morein et al. | |
| 9,587,639 B2 | | 3/2017 | Rosinski et al. | |
| 9,670,825 B2 | * | 6/2017 | Murakami | F16K 11/085 |
| 9,803,760 B2 | | 10/2017 | Morein | |
| 9,945,283 B2 | * | 4/2018 | Muizelaar | F16K 31/042 |

(Continued)

FOREIGN PATENT DOCUMENTS

| | | |
|---|---|---|
| CN | 103114902 A | 5/2013 |
| DE | 102006053311 A1 | 5/2008 |
| JP | 2016160872 A | 9/2016 |

*Primary Examiner* — Craig M Schneider
*Assistant Examiner* — Christopher D Ballman

(57) ABSTRACT

A coolant control valve is provided that includes at least one actuator, a first rotary valve body and a second rotary valve body, each rotary valve body driveably connected to the at least one actuator. The second rotary valve body is arranged non-coaxially to the first rotary valve body.

20 Claims, 7 Drawing Sheets

(56) References Cited

U.S. PATENT DOCUMENTS

| | | | |
|---|---|---|---|
| 10,107,175 B1* | 10/2018 | Bowler | F01P 7/14 |
| 10,344,883 B2* | 7/2019 | Brazas | F16K 11/0876 |
| 10,808,863 B2* | 10/2020 | Bugeja | F16K 11/165 |
| 10,975,975 B2* | 4/2021 | Sato | F16K 31/535 |
| 11,143,321 B2* | 10/2021 | Wawersig | F16D 1/0876 |
| 2007/0039653 A1* | 2/2007 | Maggard | F16K 11/22 |
| | | | 137/625.19 |
| 2009/0050830 A1* | 2/2009 | Albert | F16K 31/53 |
| | | | 137/625.46 |
| 2010/0044610 A1* | 2/2010 | Badosa Carbones | |
| | | | F16K 11/166 |
| | | | 251/248 |
| 2010/0140522 A1* | 6/2010 | Chang | F16K 5/0647 |
| | | | 251/315.16 |
| 2010/0282190 A1* | 11/2010 | Stoermer | F16K 11/10 |
| | | | 123/41.08 |
| 2015/0027575 A1 | 1/2015 | Morein | |
| 2016/0341331 A1* | 11/2016 | Lueders | F16K 31/535 |
| 2017/0058753 A1 | 3/2017 | Lee et al. | |
| 2017/0074153 A1 | 3/2017 | Kaneko et al. | |
| 2017/0138248 A1 | 5/2017 | Lee et al. | |
| 2017/0321595 A1 | 11/2017 | Jang et al. | |
| 2020/0278039 A1* | 9/2020 | Brandt | F16K 5/0647 |

\* cited by examiner

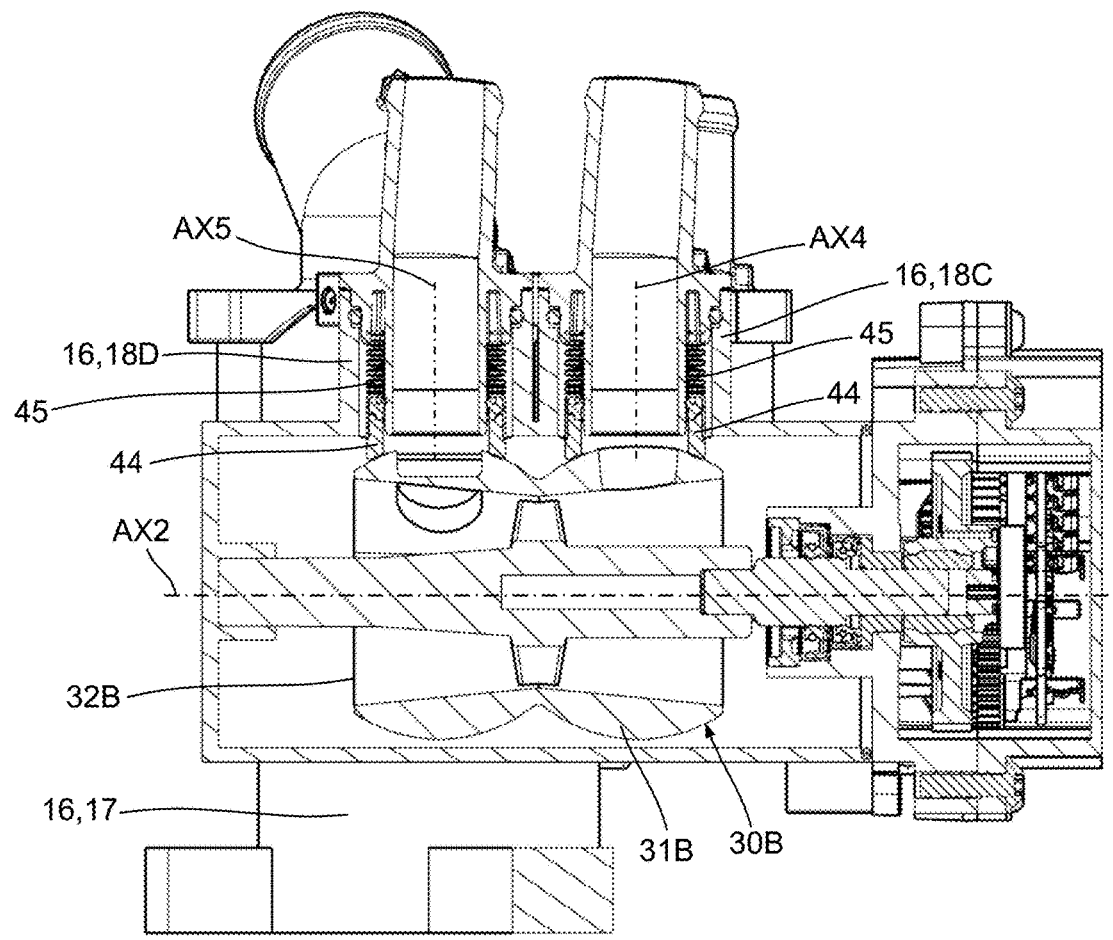
Figure 6
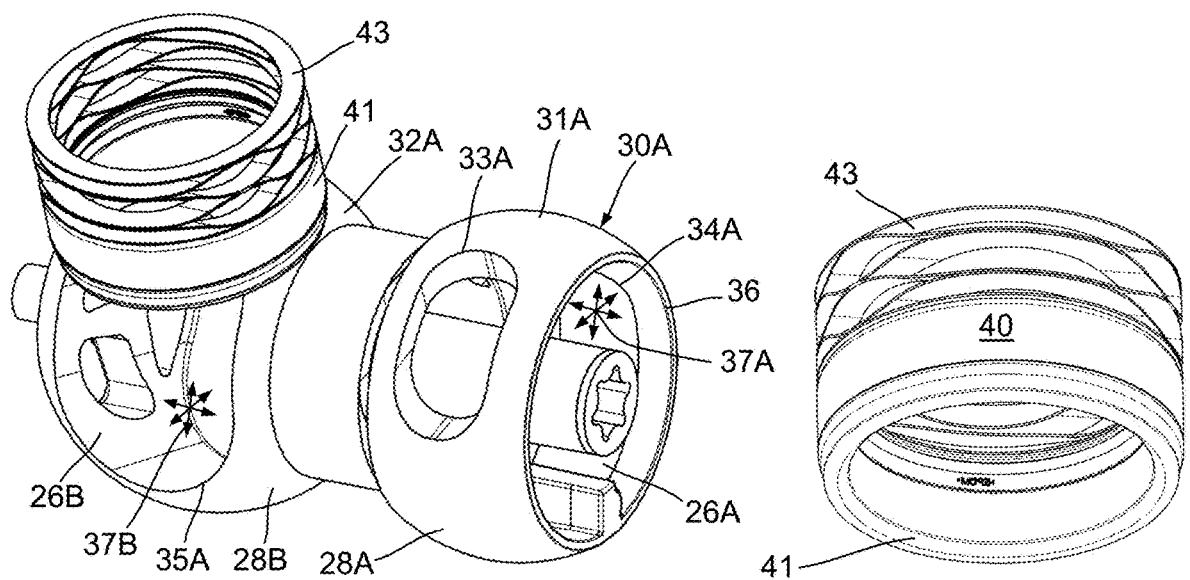
Figure 7A                                   Figure 7B

COOLANT CONTROL VALVE WITH NON-COAXIAL ROTARY VALVE BODIES

TECHNICAL FIELD

Example aspects described herein relate to coolant control valves (CCVs) for use within liquid cooling systems.

BACKGROUND

CCVs are known and can be arranged to provide coolant flow control for temperature management of various powertrain components including IC engines, transmissions and various components of electric, hybrid electric, and fuel cell vehicles.

A portion of CCVs are electro-mechanical in design, incorporating an electrical actuator assembly that interfaces with a mechanical valve body to provide a controlled flow of coolant for a selected powertrain component or system. Depending on its design, the mechanical valve body can be linearly actuated or rotary actuated by an actuator, often times in the form of an electric motor or solenoid. The valve body can be configured with one or more liquid openings that control an amount of coolant flow to or from one or more inlets or outlets arranged on an outer housing of the CCV. Packaging space for CCVs can be challenging, especially in a powertrain environment of a vehicle.

SUMMARY

An example embodiment of a CCV is described herein that includes at least one actuator, a first rotary valve body, and a second rotary valve body. Both the first rotary valve body and the second rotary valve body are driveably connected to the at least one actuator. The second rotary valve body can be driveably connected to the first rotary valve body. The second rotary valve body is arranged non-coaxially to the first rotary valve body. A first rotational axis of the first rotary valve body can be parallel to a second rotational axis of the second rotary valve body. Furthermore, a central axis of the at least one actuator can be parallel to the first and second rotational axes. The first rotary valve body can have at least one first lobe, and the second rotary valve body can have at least one second lobe. One or both of the at least one first lobe and the at least one second lobe can be formed as a spherical segment.

In an example embodiment, a gear train driveably connects: i) the first rotary valve body to the at least one actuator; and, ii) the first rotary valve body to the second rotary valve body.

In an example embodiment, the CCV includes at least one rotary valve seal that engages with one or both of the at least one first lobe and the at least one second lobe. The at least one rotary valve seal can forcibly engage an outer surface of one or both of the at least one first lobe or the at least one second lobe via a force generator or spring. The at least one rotary valve seal can be configured to move along an axis that is perpendicular to the first rotational axis of the first rotary valve body or the second rotational axis of the second rotary valve body. The at least one first lobe or the at least one second lobe can rotate relative to the at least one rotary valve seal. The at least one rotary valve seal and a radial liquid opening of the at least one first lobe or the at least one second lobe can form an overlap area that defines a liquid pathway. The at least one rotary valve seal can include a circular contact face that defines a contact zone between the at least one rotary valve seal and either one or both of the at least one first lobe and the at least one second lobe. The contact zone can vary in size throughout a rotational range of either one or both of the at least one first lobe and the at least one second lobe.

In an example embodiment, the CCV includes a first actuator and a second actuator, with the first actuator driveably connected to the first rotary valve body, and the second actuator driveably connected to the second rotary valve body.

In an example embodiment, the at least one actuator is configured to be provided electronic communication from an electronic controller to move the first rotary valve body to a selected one of any angular position within a continuous range of angular positions.

An example embodiment of a CCV is described herein that includes at least one actuator, a first rotary valve body, and a second rotary valve body. Both the first rotary valve body and the second rotary valve body are driveably connected to the at least one actuator. At least a portion of a first longitudinal span of the first rotary valve body overlaps a second longitudinal span of the second rotary valve body. The first rotary valve body can have at least one first lobe, and the second rotary valve body can have at least one second lobe. A longitudinal span of the first rotary valve body can be completely overlapped by a longitudinal span of the second rotary valve body.

In an example embodiment, the CCV also includes a drivetrain that driveably connects the at least one actuator to either one or both of the first rotary valve body and the second rotary valve body. The at least one actuator can be parallel to the first rotary valve body and the second rotary valve body. The at least one actuator, the first rotary valve body, and the second rotary valve body can extend in a first direction from a first side of the drivetrain, while the at least one actuator can extend to a length that overlaps at least one of the at least one first lobe or the at least one second lobe.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

FIG. 6 is a cross-sectional view taken from FIG. 1.

FIG. 7A is a perspective view of an example embodiment of the FRVB together with a seal and force generator.

FIG. 7B is a perspective view of the seal and force generator of FIG. 7A.

DETAILED DESCRIPTION OF THE EMBODIMENTS

Figure 1:
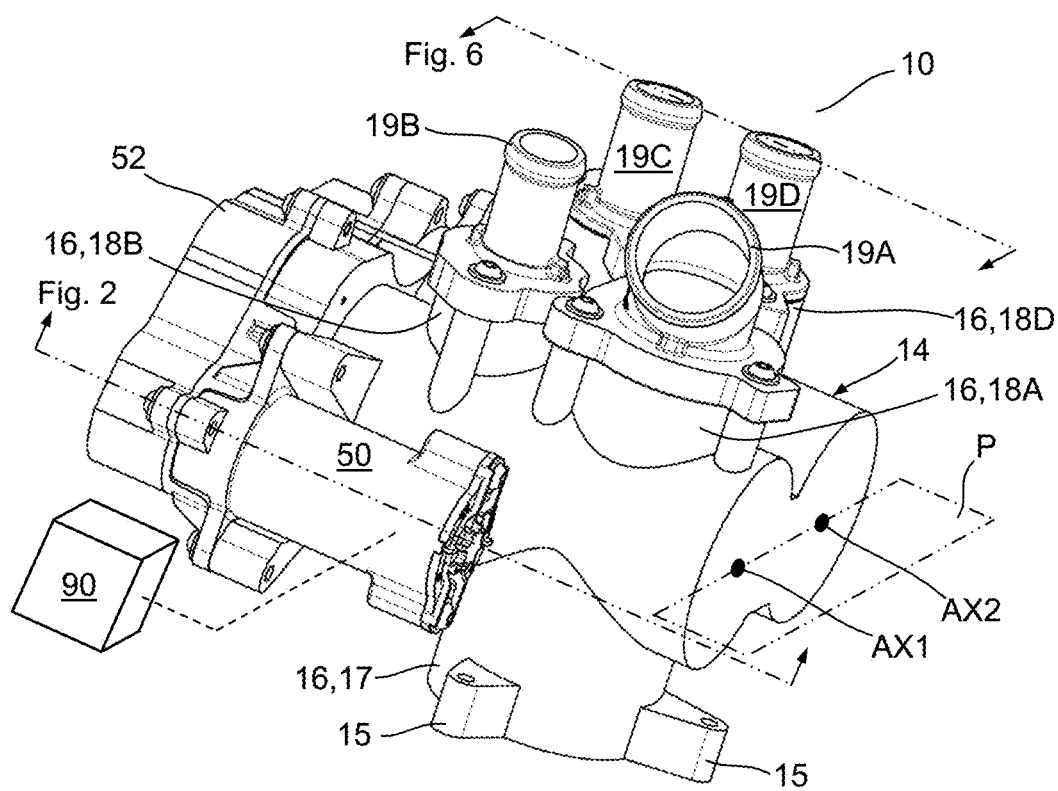
FIG. 1 is a perspective view of an example embodiment of a coolant control valve (CCV) with a single actuator.

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. Circumferentially refers to an outer boundary of a circle or curve. The words "left" and "right" designate directions in the drawings to which reference is made. The terminology includes the words specifically noted above, derivatives thereof, and words of similar import.

Figure 2:
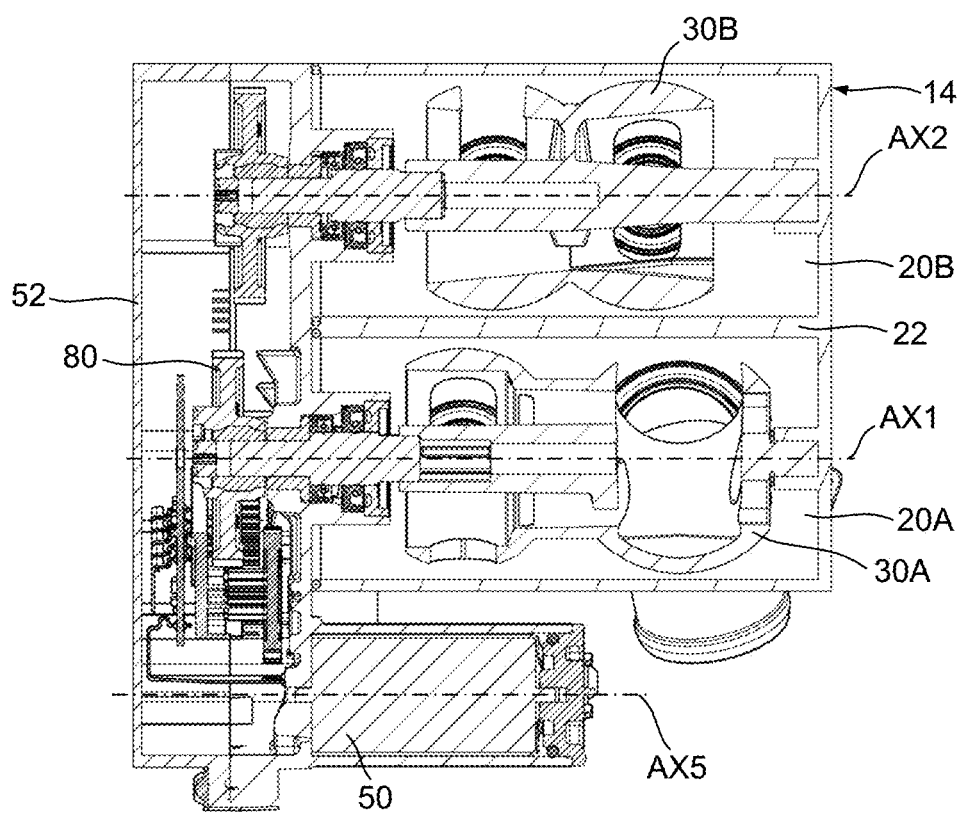
FIG. 2 is a cross-sectional view taken from the CCV of FIG. 1.
Figure 3A:
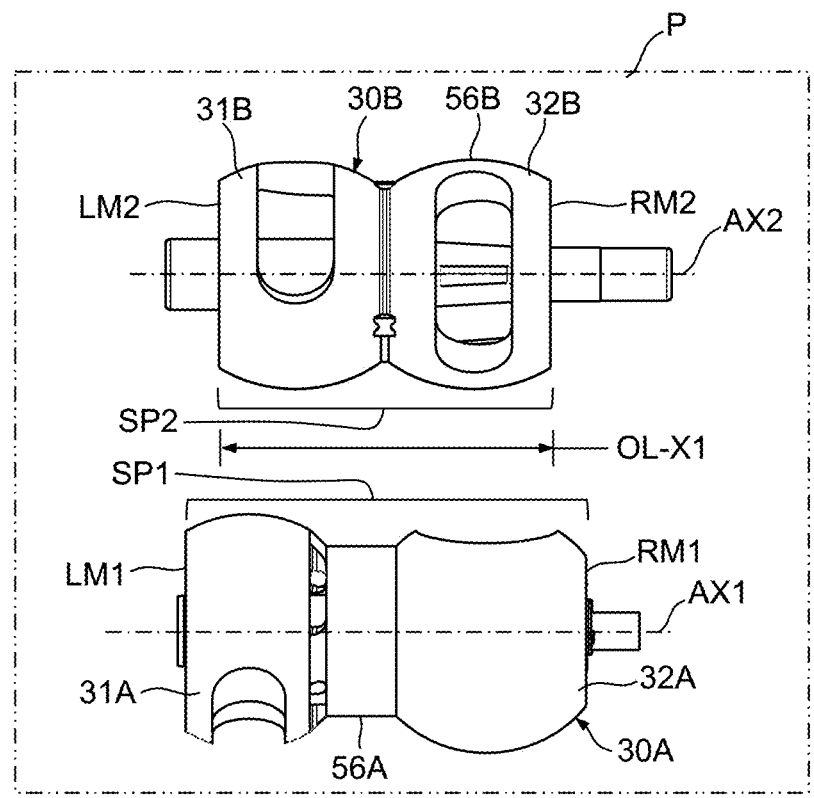
FIG. 3A is an example embodiment of an arrangement of a first rotary valve body (FRVB) and a second rotary valve body (SRVB).
Figure 3B:
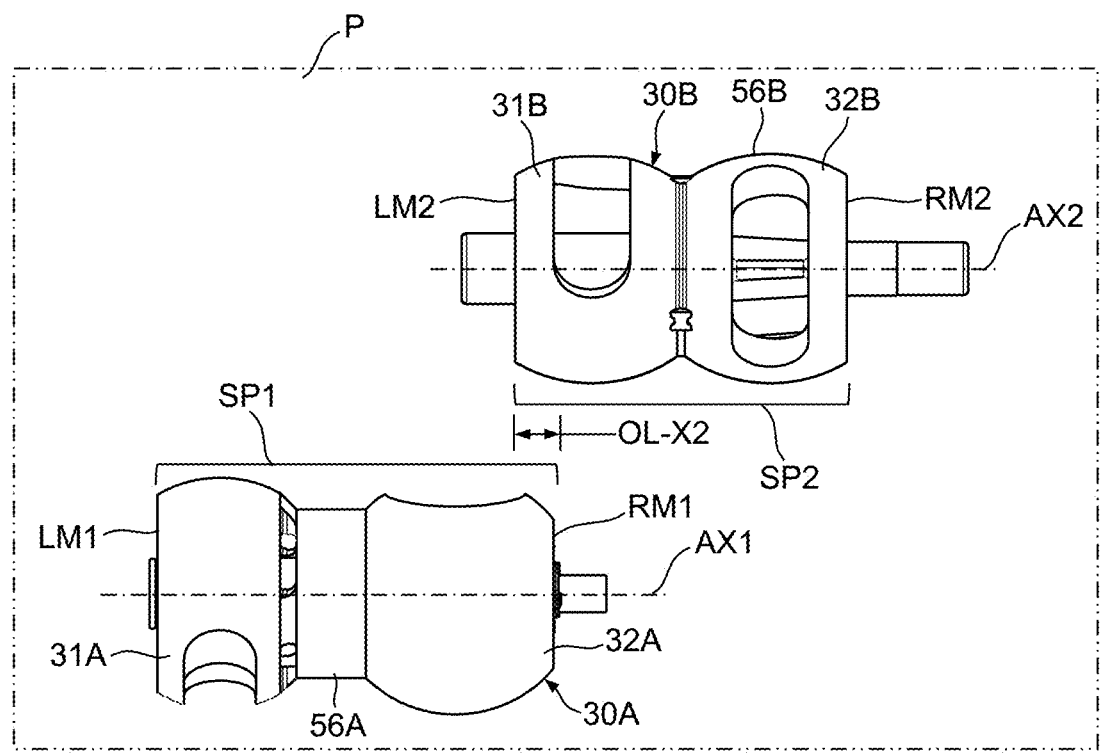
FIG. 3B is another example embodiment of an arrangement of the FRVB and the SRVB.
Figure 4:
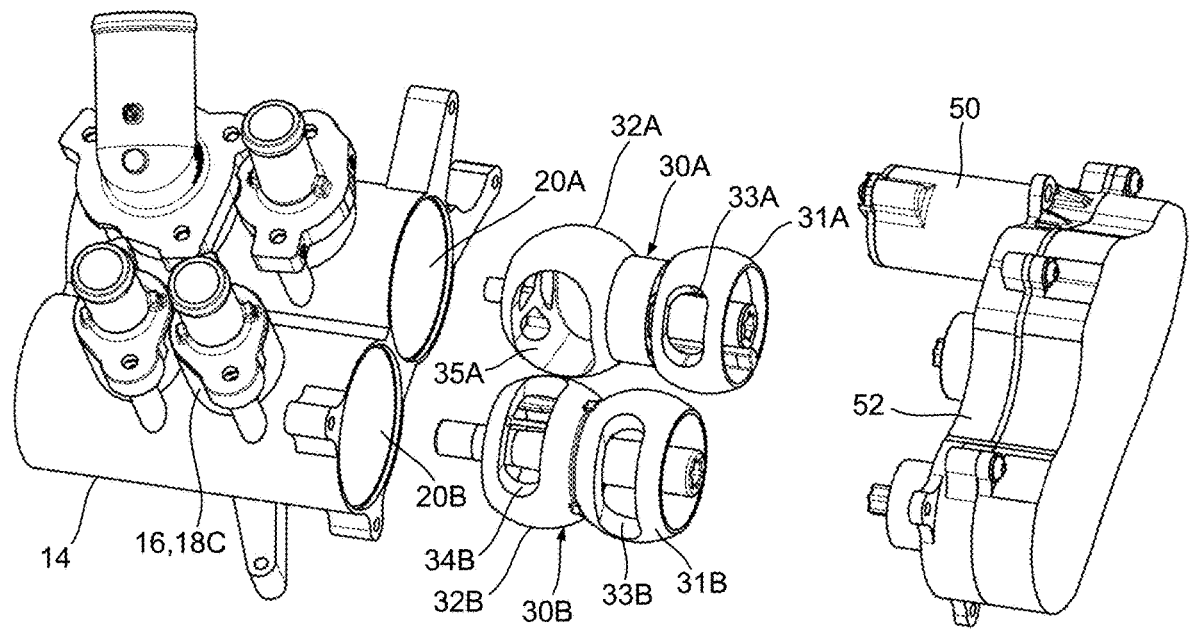
FIG. 4 is an exploded perspective view of the CCV of FIG. 1.
Figure 5:
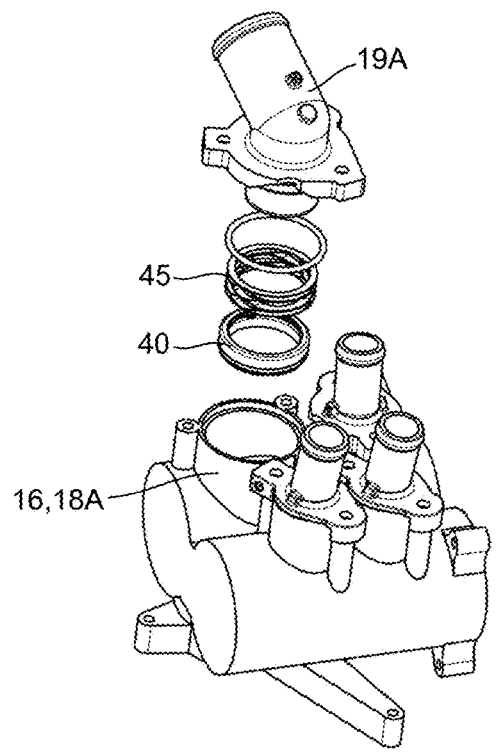
FIG. 5 is an exploded perspective view of a portion of the CCV of FIG. 1.
Figure 8A:
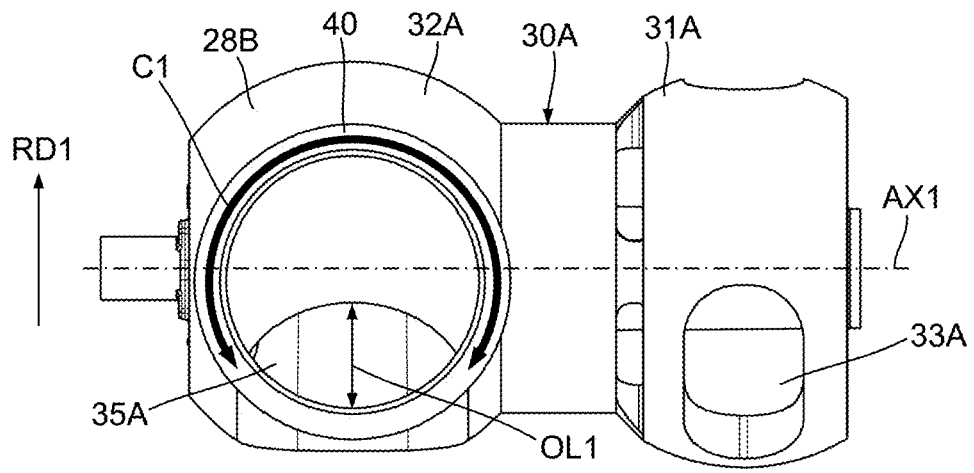
FIG. 8A is a top view of the FRVB and seal of FIG. 7A in a first rotational position of the FRVB.
Figure 8B:
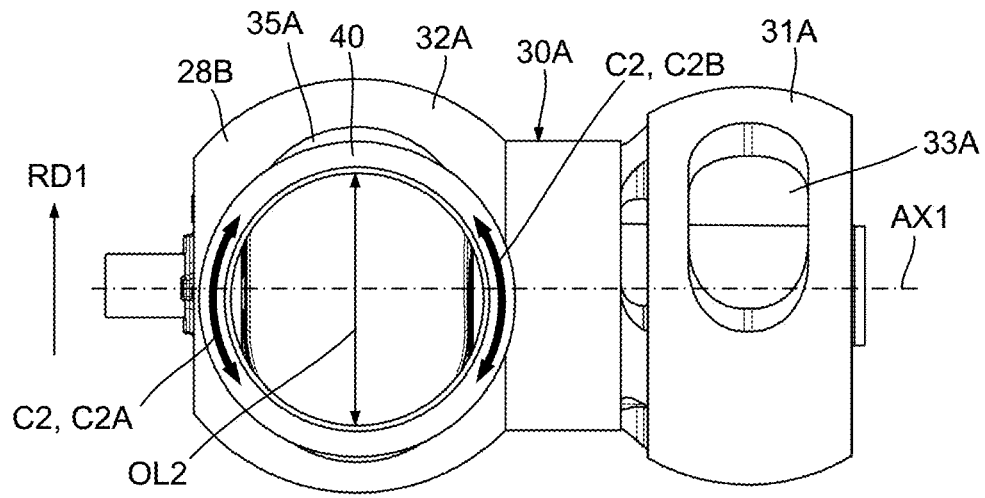
FIG. 8B is a top view of the FRVB and seal of FIG. 7A in a second rotational position of the FRVB.
Figure 8C:
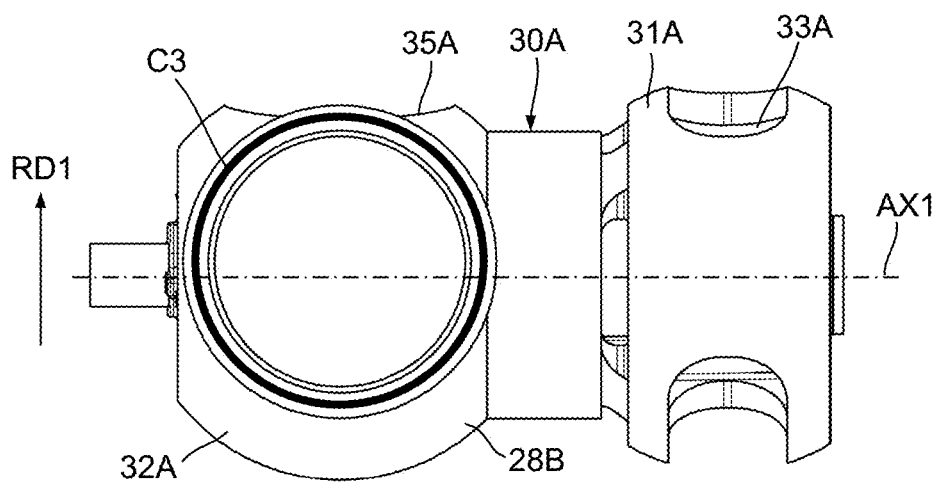
FIG. 8C is a top view of the FRVB and seal of FIG. 7A in a third rotational position of the FRVB.
Figure 9:
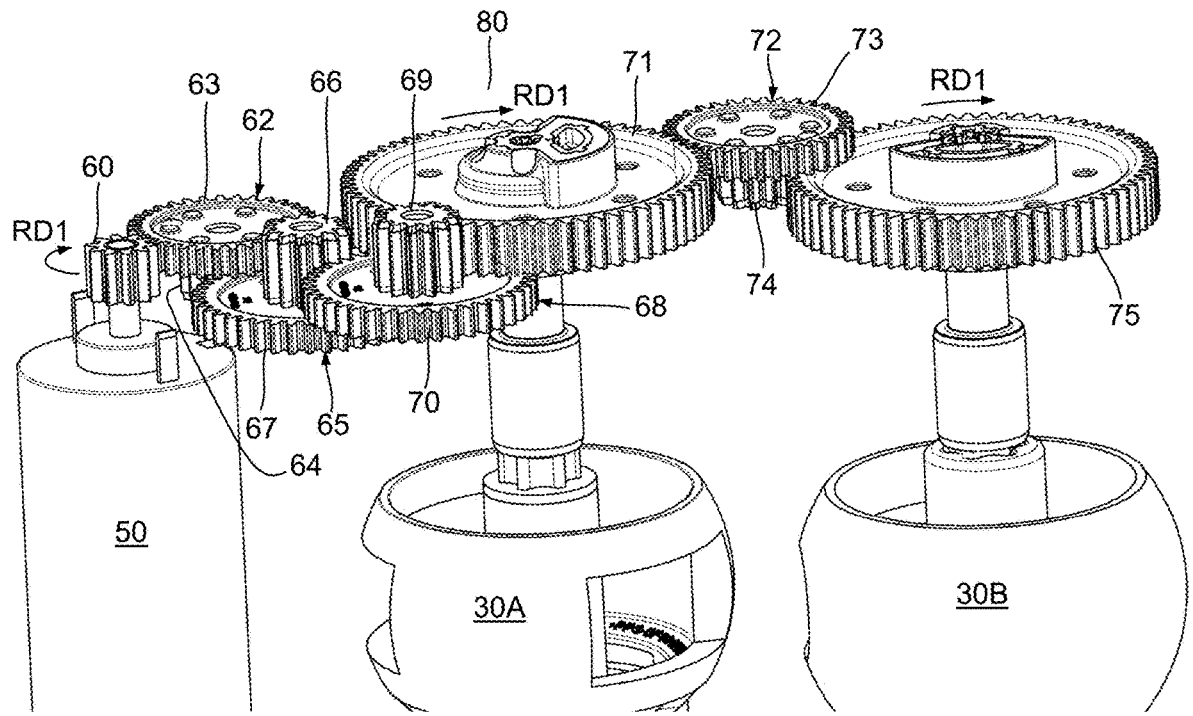
FIG. 9 is a perspective view of an example embodiment of a gear train to actuate the FRVB and the SRVB.
Figure 10:
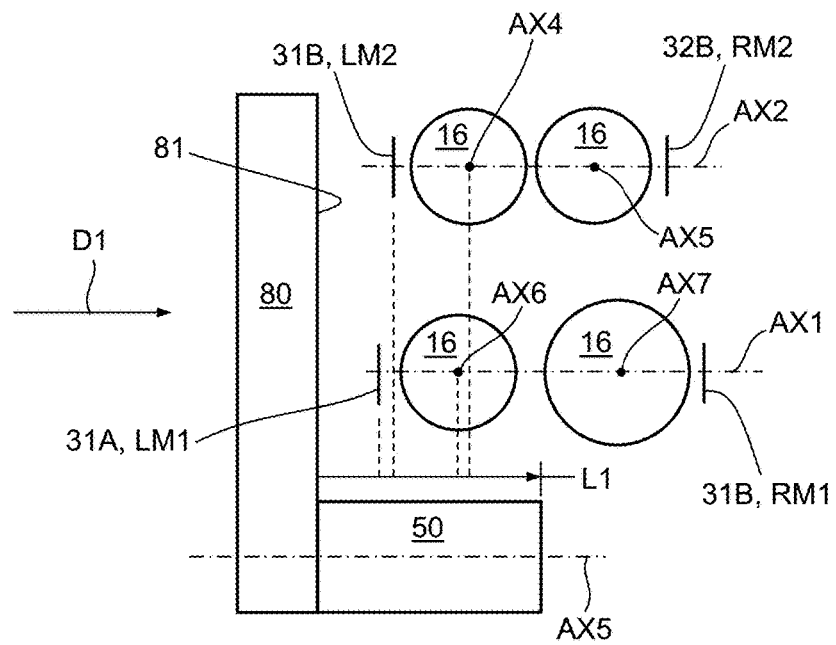
FIG. 10 is a schematic top view of the CCV of FIG. 1.
Figure 11:
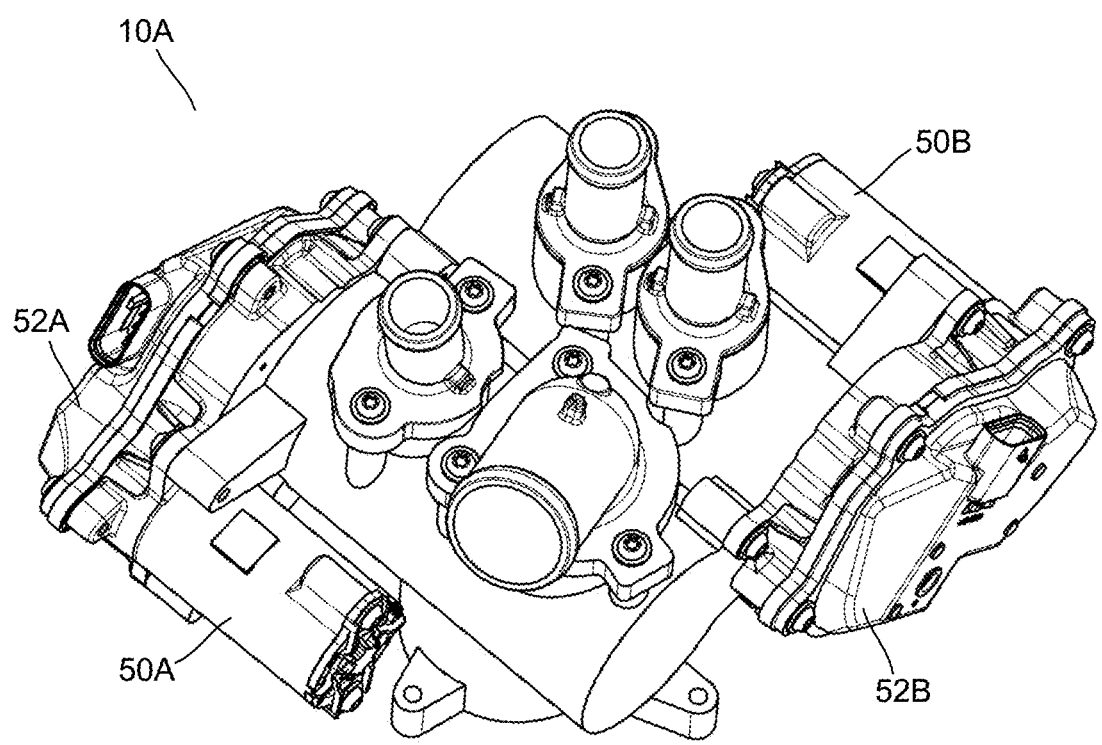
FIG. 11 is a perspective view of an example embodiment of a CCV with two actuators.

FIG. 1 shows a perspective view of a coolant control valve (CCV) 10 that includes an actuator 50, a gearbox assembly 52, an electronic controller 90, and multiple liquid openings 16. FIG. 2 is a cross-sectional view taken from FIG. 1 that shows a first rotary valve body (FRVB) 30A and a second rotary valve body (SRVB) 30B that are actuated by the actuator 50 via the gearbox assembly 52. FIGS. 3A and 3B show two different arrangements of the FRVB 30A relative to the SRVB 30B. FIGS. 4 and 5 show exploded perspective views of the CCV 10 and its various components. FIG. 6 shows a cross-sectional view of the CCV 10 showing the SRVB 30B together with a sealing arrangement. FIG. 7A shows a perspective view of the FRVB 30A together with a first rotary valve seal 40 and a force generator or spring 43; FIG. 7B shows a perspective view of the rotary valve seal 40 and spring 43. FIGS. 8A-8C show top views of the FRVB 30A in respective first, second, and third rotational positions. FIG. 9 shows a perspective view of a gear train 80 that driveably connects the actuator 50 to the FRVB 30A and SRVB 30B. FIG. 10 shows a schematic top view of the CCV of FIG. 1. FIG. 11 shows a perspective view of an example embodiment of a CCV 10A that includes a first actuator 50A and a second actuator 50B. The following discussion should be read in light of FIGS. 1 through 10.

The CCV 10 includes an outer housing 14 that has a first liquid chamber 20A and a second liquid chamber 20B. The first and second liquid chambers 20A, 20B are formed as bores but could be any suitable shape. In an example embodiment, the first liquid chamber 20A is isolated from the second liquid chamber 20B. Multiple liquid openings 16 are liquidly connected to the first and second liquid chambers 20A, 20B. The liquid openings 16, as shown in the Figures, include an inlet 17, a first outlet 18A, a second outlet 18B, a third outlet 18C, and a fourth outlet 18D; however, the location of the inlet 17 and four outlets 18A-18D could be in any suitable location on the outer housing 14. Furthermore, multiple inlets could be present on the housing 14 instead of just one. Disposed on top of each of the first, second, third, and fourth outlets 18A-18D are respective first, second, third, and fourth fittings 19A-D that facilitate connection of the four outlets 18A-18D to hoses or tubes that distribute liquid to components and/or systems that are part of a thermal management network.

A flow of liquid within the first and second liquid chambers 20A, 20B and the liquid openings 16 is managed by the FRVB 30A that is disposed within the first liquid chamber 20A of the outer housing 14 and the SRVB 30B that is disposed within the second liquid chamber 20B of the outer housing 14. The FRVB 30A includes a first lobe 31A and a second lobe 32A, and the SRVB 30B includes a third lobe 31B and a fourth lobe 32B. The first, second, third, and fourth lobes 31A, 32A, 31B, 32B, as shown, are formed as spherical segments, however, any suitable form or shape is possible. Each of the lobes 31A, 32A, 31B, 32B are configured with at least one cavity formed inside of the lobes to facilitate movement of liquid through the FRVB 30A and SRVB 30B. In essence, the respective internal cavities of the FRVB 30A and the SRVB 30B serve as liquid galleries or passageways that facilitate liquid connection of two or more liquid openings 16.

Referring to the FRVB 30A, as shown in FIGS. 4 and 7A, the first lobe 31A of the FRVB 30A has a first outer surface 28A, and a first outer wall 26A that defines a first cavity 37A. The first cavity 37A defines an axial liquid opening 36. Within the outer wall 26A, a first radial liquid opening 33A and a second radial liquid opening 34A are formed to liquidly connect the second outlet 18B to at least the first outlet 18A. With reference to the second lobe 32A of the FRVB 30A, a second outer wall 26B defines a second cavity 37B. The second cavity 37B defines a third radial liquid opening 35A that liquidly connects the first outlet 18A to at least the second outlet 18B. It should be stated that the first and second cavities 37A, 37B could have a different shape than what is shown in the figures. Furthermore, the first and second cavities 37A, 37B do not necessarily need to reside within a lobular form, such as the first lobe 31A or the second lobe 32A; other forms and structures that surround the cavities could be possible. It is intended that the term "rotary valve body", in the context of this disclosure, is representative of a rotatable component configured with at least one internal cavity, with the cavity able to receive and distribute or guide a liquid.

The amount of liquid flow through the liquid openings 16 of the outer housing 14 can be managed by rotational actuation of the FRVB 30A and SRVB 30B by the actuator 50. The actuator 50 is controlled by the electronic controller 90 such as an ECU or a dedicated CCV controller within the CCV 10 or remote from the CCV 10. Various forms of actuators are possible, such as a linear actuator or an electric motor (shown in the Figures) that rotates the FRVB 30A and SRVB 30B to a desired angular or rotational position, as determined by the electronic controller 90 and communicated electronically to the CCV 10. In an example embodiment, the actuator 50 can move the FRVB 30A and SRVB 30B to a selected one of any angular position within a continuous range of angular positions; alternatively stated, the angular positions of the FRVB 30A and the SRVB 30B are continuously variable. An amount of liquid flow through any one of the liquid openings 16 is controlled by an amount of overlap between either of the radial liquid openings 33A, 33B, 34A, 34B, 35A and the respective liquid openings 16 in the outer housing 14. Stated otherwise, an amount of liquid flow through any one of the liquid openings 16 can be changed or manipulated by rotating the first and second cavities 37A, 37B relative to the liquid openings 16 in the outer housing 14.

Seals are arranged within the liquid openings 16 to abut with outer surfaces of the FRVB 30A and SRVB 30B to facilitate precise thermal management of one or more components and/or systems by the CCV 10. This precise thermal management is achieved by minimal or zero leakage between a respective liquid opening 16 and a corresponding outer surface of the FRVB 30A and/or SRVB 30B. Referring to FIGS. 5, 7A and 7B, the first rotary valve seal 40 is shown together with a force generator or spring 45. The spring 45 provides a force that pushes the first rotary valve seal 40 against a second outer surface 28B of the second lobe 32A of the FRVB 30A. The first rotary valve seal 40 can be made from plastic, an elastomer, or any other suitable material. As shown in FIG. 7B, the first rotary valve seal 40 has a circular contact face 41 for contacting the second outer surface 28B. It is intended that the term, "rotary valve seal", in the context of this disclosure, is representative of a seal that: i) interfaces with a liquid, and ii) minimizes or prevents leakage of a liquid through a contact face of the rotary valve seal.

Referring to the cross-sectional view of FIG. 6, seal arrangements for the third outlet 18C and fourth outlet 18D are shown that include a second rotary valve seal 44 and a second spring 45. The second spring 45 provides a force that pushes the second rotary valve seal 44 against outer surfaces of the respective third and fourth lobes 31B, 32B of the SRVB 30B. As evident from FIG. 6, the spring-biased second rotary valve seal 44 arranged within each of the third and fourth outlets 18C, 18D can move along respective third and fourth central axes AX3, AX4 to adjust its axial position relative to the SRVB 30B. This is especially helpful to accommodate outer surface imperfections of the third and fourth lobes 31B, 32B or tolerances of the various components of the CCV 10 that affect a position of the SRVB 30B relative to the third and fourth outlets 18C, 18D. The third and fourth central axes AX3, AX4 are arranged perpendicularly to a first rotational axis AX1 of the FRVB 30A and the second rotational axis AX2 of the SRVB 30B.

FIGS. 8A through 8C show a top view of three of many achievable rotational positions of the FRVB 30A as it rotates in a first rotary direction RD1. The left side of each view shows the first rotary valve seal 40, and its relative position to the third radial liquid opening 35A of the FRVB 30A. FIG. 8A shows a first rotational position in which an end portion of the third radial liquid opening 35A overlaps with the first rotary valve seal 40 defining a first overlap OL1. The first overlap OL1 defines a liquid pathway and facilitates a liquid flow through the first outlet 18A. FIG. 8B shows a second rotational position in which a middle portion of the third radial liquid opening 35A overlaps with the first rotary valve seal 40, defining a second overlap OL2. As the second overlap OL2 is greater than the first overlap OL1, the second rotational position is likely to yield a higher liquid flow rate through the first outlet 18A than the first rotational position, assuming equal pressure conditions. The first rotational position could also be described as a throttled position, as a resultant liquid flow is less than a maximum fluid flow, such as that provided in the second rotational position. FIG. 8C shows a third rotational position in which no overlap exists between the first rotary valve seal 40 and the second radial liquid opening 34A, and, therefore, no liquid flow occurs through the first outlet 18A.

FIGS. 8A through 8C also illustrate how a sealing interface between the first rotary valve seal 40 and the second outer surface 28B changes in radial location on the second outer surface 28B as the FRVB 30A rotates in the first rotary direction RD1 relative to the first rotary valve seal 40 as the first rotary valve seal 40 maintains a fixed radial position within the first outlet 18A. FIGS. 8A through 8C show contact zones that exist between the circular contact face 41 of the first rotary valve seal 40 and the second outer surface 28B of the second lobe 32A. It should be stated that these contact zones are drawn as thick-lined circles (or segments thereof) on top of the first rotary valve seal 40 in FIGS. 8A-8C so that they are easily observed and understood; however, the contact zones actually reside between the circular contact face 41 of the first rotary valve seal 40 and the second outer surface 28B of the second lobe 32A; furthermore, the thickness of the thick-lined circles (or segments thereof) is not a representation of the actual width of the respective contact zones. In the first rotational position of the FRVB 30A shown in FIG. 8A, the first rotary valve seal 40 partially engages the second outer surface 28B due to the overlap of the circular contact face 41 of the first rotary valve seal 40 with the end of the second radial liquid opening 34A. A first contact zone C1 between the circular contact face 41 of the first rotary valve seal 40 and the second outer surface 28B is continuous throughout its arc shape. The arc span of the first contact zone C1 resides between 180 and 360 degrees. In the second rotational position of the FRVB 30A shown in FIG. 8B, the circular contact face 41 of the first rotary valve seal 40 again partially engages the second outer surface 28B, defining a second contact zone C2. The second contact zone C2 includes a first continuous arc-shaped contact zone C2A and a second continuous arc-shaped contact zone C2B. In the third rotational position of the FRVB 30A shown in FIG. 8C, the circular contact face 41 of the first rotary valve seal 40 fully engages the second outer surface 28B, resulting in a third continuous contact zone C3 shaped as a circle. In summary, it could be stated that in any rotational angle of the FRVB 30A, some form of a round contact zone between the first rotary valve seal 40 and the second outer surface 28B is present; and, furthermore, this round contact zone varies in size throughout a rotational range of the FRVB 30A.

The outer housing 14 of CCV 10 is configured with mounting feet 15 to mount the CCV 10 to any receiving structure or mounting base, such as that of an IC engine (not shown). Other designs or features that facilitate attachment of the CCV 10 could also suffice. For material optimization, the shape of the outer housing 14 is that of a figure-eight with the first and second liquid chambers 20A, 20B formed as siamesed-bores, meaning that the bores share an inner wall 22. The inner wall 22 is configured so that liquid cannot flow between the first and second liquid chambers 20A, 20B via the inner wall 22.

Now referring to FIG. 2, the arrangement of the FRVB 30A and the SRVB 30B within the CCV 10 provides an optimized longitudinal packaging space while facilitating separation of the first and second liquid chambers 20A, 20B, which is necessary for some thermal management system applications. A first rotational axis AX1 of the FRVB 30A is parallel and non-coaxial to a second rotational axis AX2 of the SRVB 30B. In other designs, multiple rotary valve bodies are arranged coaxially and in series, which increases the length of a CCV and provides packaging challenges.

FIGS. 3A and 3B show different tandem arrangements of the FRVB 30A and the SRVB 30B that provide optimized CCV packaging. These views are representative of a top view of a plane P on which both the first and second rotational axes AX1, AX2 reside (plane P is also shown in FIG. 1). A first span SP1 of the FRVB 30A is shown that encompasses a distance from a left-most axial extent LM1 of the first lobe 31A to a right-most axial extent RM1 of the second lobe 32A. It can be stated that the first span SP1 represents a distance from a left-most axial extent to a right-most axial extent of a first lobe group 56A that can include any number of lobes (including one). Additionally, a second span SP2 is shown that encompasses a distance from a left-most axial extent LM2 of the third lobe 31B to a right-most axial extent RM2 of the fourth lobe 32B. As with the first span SP1, it can be stated that the second span SP2 represents a distance from a left-most axial extent to a right-most axial extent of a second lobe group 56B that can include any number of lobes (including one). With view to FIG. 3A, a first overlap OL-X1 between the first span SP1 and the second span SP2 is shown that has a length equal to the second span SP2. The first overlap OL-X1 is equal to the second span SP2 since the first span SP1 encompasses all of the second span SP2. With view to FIG. 3B, a second overlap OL-X2 between the first span SP1 and the second span SP2 is shown that, even though smaller than the first overlap OL-X1, still represents a packaging advantage offered by a parallel and non-coaxial arrangement of the FRVB 30A and the SRVB 30B.

With reference to FIG. 9, the actuator 50 is driveably connected to both the FRVB 30A and the SRVB 30B via a gear train 80. Stated otherwise, rotation of the actuator 50 causes rotation of the FRVB 30A and the SRVB 30B. An actuator gear 60, which rotates in unison with an output of the actuator 50, driveably engages a first upper gear 63 of a first gear 62. Rotation of the first gear 62 by the actuator gear 60 causes rotation of a second gear 65 via engagement of a first lower gear 64 to a second lower gear 67. Rotation of the second gear 65 causes rotation of a third gear 68 via engagement of a second upper gear 66 to a third lower gear 70. Rotation of the third gear 68 causes rotation of a first rotary valve body (FRVB) gear 71 via engagement of a third upper gear 69 to the FRVB gear 71. Rotation of the FRVB gear 71 causes rotation of a fourth gear 72 via engagement of a fourth upper gear 73 with the FRVB gear 71. Rotation of the fourth gear 72 causes rotation of a second rotary valve body (SRVB) gear 75 via engagement of a fourth lower gear 74 with the SRVB gear 75. As evident from FIG. 9, the actuator 50, actuator gear 60, FRVB gear 71, and SRVB gear 75 all rotate in the same rotary direction RD1. However, the fourth gear 72 could be eliminated to achieve opposite rotational directions of the FRVB gear 71 and the SRVB gear 75. Many types of gear trains, other than what are shown, can be utilized to rotatably connect the FRVB 30A and the SRVB 30B to the actuator 50.

With reference to FIGS. 10 and 3A-3B, another packaging enhancement of the CCV 10 is the optimized location of the actuator 50. A central axis AX5 of the actuator 50 is parallel and non-coaxial to the first and second rotational axes AX1, AX2 of the respective FRVB 30A and the SRVB 30B. It could also be stated that the actuator 50, FRVB 30A, and SRVB 30B all extend from a first side 81 of the gear train 80 or drivetrain in a first direction D1, with the actuator 50 extending to a longitudinal length L1 that: A) overlaps at least one of the first, second, third, or fourth lobes 31A, 32A, 31B, 32B of the respective FRVB 30A or the SRVB 30B; or, stated otherwise, overlaps at least one of the left-most axial extent LM1 of the first lobe 31A of the FRVB 30A or the left-most axial extent LM2 of the third lobe 31B of the SRVB 30B; or, stated yet in another way, overlaps at least one of the first lobe group 56A or the second lobe group 56B; or, B) overlaps at least one of the centers of the liquid openings 16 of the outer housing 14.

FIG. 11 shows a CCV 10A with a first actuator 50A and a second actuator 50B that, in conjunction with a respective first gearbox 52A and a second gearbox 52B, actuate the FRVB 30A and SRVB 30B.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What I claim is:

1. A coolant control valve, comprising:
    at least one actuator;
    a housing having an inner wall configured to separate a first liquid chamber from a second liquid chamber;
    a first rotary valve body disposed within the first liquid chamber and driveably connected to the at least one actuator, the first rotary valve body having a first rotational axis; and
    a second rotary valve body disposed within the second liquid chamber and driveably connected to the at least one actuator, the second rotary valve body having a second rotational axis; and
    the first rotational axis is parallel and non-coaxial to the second rotational axis; and
    the inner wall is configured so that liquid cannot flow between the first and second liquid chambers via the inner wall at any angular position of the first and second rotary valve bodies.

2. The coolant control valve of claim 1, wherein the second rotary valve body is driveably connected to the first rotary valve body.

3. The coolant control valve of claim 2, further comprising a gear train that driveably connects the first rotary valve body to the at least one actuator.

4. The coolant control valve of claim 3, wherein the gear train driveably connects the first rotary valve body to the second rotary valve body.

5. The coolant control valve of claim 1, wherein the first rotary valve body has at least one first lobe and the second rotary valve body has at least one second lobe.

6. The coolant control valve of claim 5, further comprising at least one rotary valve seal that engages at least one of the at least one first lobe or the at least one second lobe, the at least one rotary valve seal configured to move along an axis arranged perpendicularly to a first rotational axis of the first rotary valve body or a second rotational axis of the second rotary valve body.

7. The coolant control valve of claim 6, wherein the at least one rotary valve seal forcibly engages an outer surface of the at least one first lobe or the at least one second lobe.

8. The coolant control valve of claim 7, wherein the at least one first lobe or the at least one second lobe rotates relative to the at least one rotary valve seal.

9. The coolant control valve of claim 8, wherein the at least one rotary valve seal and a radial liquid opening of the at least one first lobe or the at least one second lobe form an overlap area that defines a liquid pathway.

10. The coolant control valve of claim 6, wherein the at least one rotary valve seal includes a circular contact face that defines a contact zone between the at least one rotary valve seal and the at least one first lobe or the at least one second lobe.

11. The coolant control valve of claim 10, wherein the contact zone varies in size throughout a rotational range of the at least one first lobe or the at least one second lobe.

12. The coolant control valve of claim 1, wherein the at least one actuator includes a first actuator and a second actuator, the first actuator driveably connected to the first rotary valve body, and the second actuator driveably connected to the second rotary valve body.

13. The coolant control valve of claim 1, wherein the at least one actuator is configured to be provided electronic communication from an electronic controller to move the first rotary valve body to a selected one of any angular position within a continuous range of angular positions.

14. The coolant control valve of claim 1, wherein a central axis of the at least one actuator is parallel to the first and second rotational axes.

15. A coolant control valve, comprising:
 at least one actuator;
 a housing having:
  a first liquid chamber;
  a second liquid chamber; and
  an inner wall shared by the first and second liquid chambers;
 a first rotary valve body disposed within the first liquid chamber and driveably connected to the at least one actuator, the first rotary valve body having a first rotational axis; and
 a second rotary valve body disposed within the second liquid chamber and driveably connected to the at least one actuator, the second rotary valve body having a second rotational axis; and
 at least a portion of a first longitudinal span of the first rotary valve body overlaps a second longitudinal span of the second rotary valve body; and
 at least one of the first rotary valve body or secondary rotary valve body has an internal cavity, the internal cavity configured to receive a liquid; and
 the first rotational axis is parallel and non-coaxial to the second rotational axis; and
 the inner wall configured so that liquid cannot flow between the first and second liquid chambers via the inner wall at any angular position of the first and second rotary valve bodies.

16. The coolant control valve of claim 15, wherein the first rotary valve body has at least one first lobe and the second rotary valve body has at least one second lobe.

17. The coolant control valve of claim 16, wherein a first longitudinal span of the first rotary valve body is completely overlapped by a second longitudinal span of the second rotary valve body.

18. The coolant control valve of claim 16, further comprising a drivetrain that driveably connects the at least one actuator to at least one of the first rotary valve body or the second rotary valve body, wherein:
 the at least one actuator is parallel to the first rotary valve body and the second rotary valve body;
 the at least one actuator, the first rotary valve body and the second rotary valve body extend in a first direction from a first side of the drivetrain; and,
 the at least one actuator extends to a length that overlaps at least one of the at least one first lobe or the at least one second lobe.

19. The coolant control valve of claim 15, wherein the inner wall extends longitudinally in a direction parallel to the first and second rotational axes such that a longitudinal length of the inner wall exceeds both the first longitudinal span and the second longitudinal span.

20. A coolant control valve, comprising:
 at least one actuator;
 a housing having an inner wall configured to separate the housing into a first liquid chamber and a second liquid chamber that are continuously, fluidically isolated from one another;
 a first rotary valve body disposed within the first liquid chamber and driveably connected to the at least one actuator, the first rotary valve body having a first rotational axis; and
 a second rotary valve body disposed within the second liquid chamber and driveably connected to the at least one actuator, the second rotary valve body having a second rotational axis; and
 the first rotational axis is parallel and non-coaxial to the second rotational axis.

* * * * *